United States Patent Office 3,206,358
Patented Sept. 14, 1965

3,206,358
PYRIDINOLS EMPLOYED IN ANIMAL HUSBANDRY
Graham T. Stevenson, Midland, Mich., assignor to The Dow Chemical Company, Midland, Mich., a corporation of Delaware
No Drawing. Filed Sept. 25, 1963, Ser. No. 311,328
19 Claims. (Cl. 167—53)

This invention relates to animal husbandry and more particularly to methods and compositions adapted to be employed for improving the growth of animals, for improving the efficiency of the utilization of animal feed, for controlling protozoan organisms and for mitigating against the attack of gastro-intestinal parasites.

It is an object of the present invention to provide a new and improved practice for raising and benefiting animals and fowl such as pigs, dogs, lambs, calves, chickens, ducks, pigeons, geese, turkeys and other domesticated animals. A further object is to provide a new and improved method for mitigating against and protecting animals from the attack of gastro-intestinal parasites. An additional object is the provision of a method of improving the utilization of feed by animals and for improved feed efficiency. Another object is the improvement in the nutritive value of the feed ingested and utilized by animals so as to obtain a growth-furthering effect and an improved feed utilization. Another object is to provide a novel method for the control of protozoan organisms, and for protecting animals from the attack of protozoan organisms and particularly from the attack of coccidia. A further object is the provision of a method to protect animals from the attack of the various strains of the same species of coccidial organism. Another object is to provide a novel method for benefiting and improving the growth of animals. Still another object is to provide a method which may be employed prophylactically to protect animals from the attack of gastro-intestinal parasites without adversely affecting the metabolic activity, reproduction or the blood-forming organs of animals. A further object is to provide novel feed compositions adapted to be employed in the new methods in animal husbandry. Other objects will appear throughout the following specification and appended claims.

The new method comprises administering to animals a 3,5-dihalo-2,6-di-lower alkyl)-4-pyridinol and/or its lower alkanoic acid ester and/or its alkali metal, ammonium or mineral acid salt. The 3,5-dihalo-2,6-di(lower alkyl)-4-pyridinol corresponds to the formula:

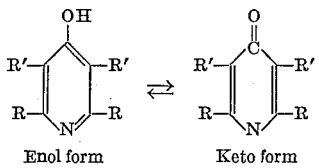

Enol form     Keto form

In this and succeeding formulae, each R represents lower alkyl and each R' represents halogen. The alkali metal and ammonium salts correspond to the formula:

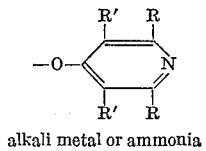

alkali metal or ammonia

The mineral acid salts are represented by the following formula

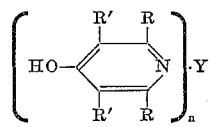

wherein Y is the mineral acid and $n$ is an integer not greater than the number of acid hydrogen atoms in the mineral acid. Preferred salts are those wherein $n$ corresponds to the number of acid hydrogen atoms in said acid. The lower alkanoic acid esters are represented by the following formula

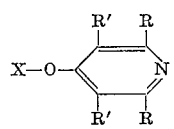

wherein X represents lower alkanoyl. In the present specification and claims, the expressions "lower alkyl," "lower alkanoyl" and "lower alkanoic acid" are employed to refer to radicals or acids containing not in excess of four carbon atoms. Thus, the expression "lower alkyl" refers to radicals such as methyl, ethyl, propyl, isopropyl, butyl, secondary butyl and tertiary butyl and the expression "lower alkanoyl" to the alkanoyl radicals derivable from such acids as formic, acetic, propionic, butyric, and isobutyric.

The practice of the present invention improves the nutritive value of animal feed so as to obtain a growth-furthering effect and improves the efficiency of the utilization of feed by animals. The practice also improves the growth made by the animals and protects the animals from parasitic diseases of the gastro-intestinal tract and particularly from coccidiosis. Further, the practice protects the animals from mixed coccidial infections and from the various strains of the same species of coccidial organism and particularly from the various strains of *Eimeria tenella and necatrix*. Also, while protecting the animals from coccidiosis, the practice allows the protected animals which are exposed to the coccidial infection to develop acquired immunity to the disease.

The pyridine-type compounds are crystalline solids which are somewhat soluble in organic solvents and are adapted to be administered to animals. The alkali metal, ammonium and mineral acid salts such as the sodium, potassium, lithium, hydrochloride, hydrobromide, hydroiodide, nitrate, nitrite, sulfate, acid sulfate, sulfite, phosphite, acid phosphate and phosphate are somewhat soluble in water. The compounds are not repellent to animals and can be employed in admixture with grain rations or animal feeds. They can be administered continuously or intermittently in dosages sufficient to improve growth, to improve the feed efficiency, to improve the nutritive value and utilization of feed, or to protect the animal from the attack of gastro-intestinal parasites without adversely affecting the metabolic activity, reproduction or the blood-forming organs, or without imparting any unpalatable characteristic to animal flesh.

The oral administration of feeding of an effective dosage of the compounds is essential and critical for the practice of the present invention. In general, good results are obtained when the animals are fed a daily dosage of from 3 to 2,000 milligrams of the compounds per kilogram of body weight and preferably from 3 to 250 milligrams per kilogram of body weight. Where danger of re-exposure to the attack of intestinal parasites from contaminated feed or surroundings is low, good reesults are obtained when the animals are fed a daily dosage of 35 milligrams or more per kilogram of body weight for a period of from 2 to 5 days.

The method of the present invention can be carried out by the oral administration or feeding of the unmodified compounds. However, the present invention also embraces the employment of a liquid, powder, mash, pellet, capsule or other animal food containing said compounds. In such usage, the compounds can be modified with one or more of a plurality of additaments or innocuous ingestible adjuvants including water, ethanol, skim milk, edible oils, propylene glycol, syrups, grain rations, surface active dispersing agents such as the liquid and solid emulsifying agents and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. In such animal feed compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The exact concentration of the compounds to be employed in the compositions can vary provided that enough of the composition is ingested by the animal so as to provide the required internal amount of active ingredient. For example, where direct administration to the individual animal is preferred, liquid or solid compositions containing from 5 to 98 percent by weight of the agents conveniently are employed to supply the desired dosage. Where the compounds are provided as as constituent of the principal food ration, satisfactory results are obtained with food rations containing a minor but effective amount of the compounds. The exact amounts of the compounds in the ration are dependent upon the food consumption and feeding habits of the animal concerned. In poultry and fowl, the required dosages can be supplied with mash compositions containing from 0.001 to 0.1 percent by weight of the active agents. In larger animals such as pigs, the required dosage can be supplied with mash compositions containing from 0.001 to 0.5 percent by weight of active material when fed as the principal food ration. Where the compounds are furnished in the drinking water, good results are obtained at concentrations of the agents in the water equal to one-half those employed when the compounds are supplied as a constituent in the principal food ration. In compositions to be employed as concentrates, the active agents can be present in a concentration of from 5 to 98 percent by weight. Preferred concentrate compositions oftentimes contain two or more percent by weight of a liquid or solid surface active agent.

Liquid compositions containing the desired amount of the compounds can be prepared by dissolving the compounds in ethanol, propylene glycol or an edible oil or by dispersing them in water with or without the aid of a suitable surface active dispersing agent such as an ionic or non-ionic surface active agent. Suitable surface active dispersing agents include the glycerol and sorbitan esters of fatty acids and the polyoxyalkylene derivatives of fatty alcohols and of sorbitan esters. The aqueous compositions can contain one or more water-immiscible oils as a solvent for the active agent. In such compositions, the water, oil and emulsifying agent constitute an aqueous emulsion adjuvant or helper.

In the preparation of solid feed compositions, the compounds can be mechanically ground with an edible solid such as cereal meal, oyster shell flour, or a solid surface active dispersing agent such as finely divided bentonite or fuller's earth. These compositions can be administered in the form of capsules or tablets or dispersed in an animal feed and such feed used to supply a part or all of the ration. Alternatively, the compounds can be dissolved in an organic solvent such as alcohol or acetone and the resulting mixture dispersed in an animal feed which is then dried to remove the solvent. The compounds can also be dispersed in an edible oil such as coconut, olive, cottonseed or peanut oil and the resulting mixtures dispersed in the feed. These edible oil compositions can contain one of the aforementioned emulsifying materials as a dispersing agent.

The following examples illustrate the invention but are not to be construed as limiting.

*Example 1*

3,5-dichloro-2,6-dimethylpyridinol was dispersed in commercial poultry mash to produce animal feed compositions containing various amounts of the pyridinol compound. Portions of these compositions and unmodified mash were fed as a sole feed ration to flocks of chickens of the same history and past environment which were about 17 days old. One day after the diets were begun, 50,000 sporulated *Eimeria necatrix* oocysts were introduced directly into the crop of the birds. Another flock of birds was left untreated and uninoculated to serve as an uninfected check. Seven days following the initiation of the diets, the birds were sacrificed, autopsied and an examination made to determine the percent control of coccidiosis and of the coccidial organisms. The percent control of coccidiosis and the coccidial organisms obtained in the evaluations at the indicated percent by weight of pyridinol compound in the diets as well as in the infected and uninfected checks is set forth in the following table.

| Agent Employed in Diet | Percent by Weight of Agent in Feed | Percent Control of Coccidiosis and the Coccidial Organisms |
| --- | --- | --- |
| 3,5-dichloro-2,6-dimethyl-pyridinol | 0.05 | 100 |
|  | 0.025 | 100 |
|  | 0.0125 | 100 |
|  | 0.0063 | 96 |
| Infected check | 0 | (¹) |
| Uninfected check | 0 | (²) |

¹ All birds heavily infected with coccidial organisms.
² No coccidial organisms or disease.

*Example 2*

3,5-dichloro-2,6-dimethylpyridinol and 3,5-dibromo-2,6-dimethylpyridinol were dispersed in commercial poultry mash to produce animal feed compositions containing 0.01 percent by weight of one of the pyridinol compounds. Portions of these compositions and unmodified mash were fed as sole feed rations to flocks consisting of about 32 chickens of the same history and past environment which were about one week old. Just prior to the initiation of the diets, and 7 weeks thereafter, the birds were weighed and the average weight gain per bird for each test group determined. During the 7 weeks, a record was kept of the feed consumed by each test group and the feed efficiency factor or number of grams of feed eaten per gram of body weight gained was determined.

| Agent Employed in Diet | Average Weight Gain Per Bird in Grams | Feed Efficiency Factor |
| --- | --- | --- |
| 3,5-dichloro-2,6-dimethyl-pyridinol | 1,295 | 2.31 |
| 3,5-dibromo-2,6-dimethyl-pyridinol | 1,295 | 2.20 |
| Check | 1,276 | 2.38 |

*Example 3*

Portions of the feed compositions as described in Example 1 and unmodified poultry feed were fed as a sole ration to groups of chickens of the same history and past environment. Each test group consisted of 30 birds which were about 16 days old. The birds were maintained on wire in battery brooders according to conventional sanitary poultry practices. One day following the initiation of the diets, 200,000 sporulated oocysts of a mixed culture of *Eimeria tenella* oocysts and *Eimeria necatrix* oocysts were introduced directly into the crop of each bird. Another 30 bird flock was left untreated and uninoculated to serve as an uninfected check.

During the interval between the 4th and 11th days following the initiation of the diets, the birds were observed for bloody diarrhea and gastrointestinal hemorrhage attributable to coccidial disease and the attack of the coccidial organisms. Hemorrhage scores were made with 0 for no hemorrhage, 1 for slight hemorrhage, 2 for moderate hemorrhage, 3 for severe hemorrhage and 4 for very severe hemorrhage.

Following the inoculation, the birds were observed for mortality, and any birds which died were autopsied to ascertain whether or not their death was attributable to coccidial disease and the attack of the coccidial organisms. The hemorrhage scores for the treated birds were also compared with the hemorrhage scores for the infected checks and the percent control of hemorrhage determined. The results obtained in these operations are set forth in the following table.

| Percent Concentration Used in Feed | Percent Mortality Due to *Eimeria tenella* and *Eimeria necatrix* | Percent Control of Hemorrhage |
|---|---|---|
| 3,5-dichloro-2,6-dimethyl-pyridinol: | | |
| 0.025 | 0 | 100 |
| 0.0125 | 0 | 100 |
| 0.0063 | 0 | 100 |
| Infected check | 93 | (1) |
| Uninfected check | 0 | (2) |

[1] All birds showed very severe hemorrhage.
[2] No hemorrhage.

*Example 4*

Portions of the feed compositions as described in Example containing 3,5-dichloro-2,6-dimethylpyridinol and 3,5-dibromo-2,6-dimethylpyridinol and unmodified feed were employed in the manner as described in the preceding example and were fed to 30 bird groups of chickens subsequently inoculated with *Eimeria necatrix*. In such operations, the inoculum employed per bird contained 200,000 sporulated *necatrix* oocysts. The results obtained in these operations are set forth in the following table.

| Percent Concentration Used in Feed | Percent Mortality Due to *Eimeria necatrix* |
|---|---|
| 3,5-dichloro-2,6-dimethylpyridinol: | |
| 0.0063 | 0 |
| 0.0125 | 0 |
| 3,5-dibromo-2,6-dimethylpyridinol: | |
| 0.0063 | 0 |
| 0.0125 | 0 |
| Infected check | 93 |
| Uninfected check | 0 |

*Example 5*

In a similar operation, 3,5-dichloro-2,6-dimethylpyridinol and 3,5-dibromo-2,6-dimethyl-pyridinol were fed as constituents of animal feed to 30 bird groups of chickens and the chickens subsequently inoculated with a mixed culture of various species of coccidia. In such operations, the inoculum employed per bird contained sporulated coccidial oocysts in number and type as follows: 30,000 *Eimeria tenella*, 30,000 *Eimeria necatrix*, 50,000 *Eimeria brunetti*, 400,000 *Eimeria mivati* and 200,000 *Eimeria acervulina*. The results obtained in these operations are set forth in the following table.

| Percent Concentration Used in Feed | Percent Mortality Due to Coccidia | Percent Control of Hemorrhage |
|---|---|---|
| 3,5-dichloro-2,6-dimethyl-pyridinol: | | |
| 0.0063 | 0 | 100 |
| 0.0125 | 0 | 100 |
| 3,5-dibromo-2,6-dimethyl-pyridinol: | | |
| 0.0063 | 0 | 100 |
| 0.0125 | 0 | 100 |
| Infected check | 77 | (1) |
| Uninfected check | 0 | (2) |

[1] All birds showed very severe hemorrhage.
[2] No hemorrhage.

*Example 6*

3,5-dibromo-2,6-dimethylpyridinol; 3,5-dibromo-2,6-dimethylpyridinol, hydrobromide; 3,5-diiodo-2,6-dimethylpyridinol; 3,5-dibromo-2,6-dimethylpyridinol, sodium salt; 3,5-dibromo-2,6-diethylpyridinol; 3,5-dibromo-2,6-dimethylpyridyl acetate; 3,5-dibromo-2,6-dipropylpyridinol; 3,5-dibromo-2-ethyl-6-methylpyridinol; and 3,5-dichloro-2,6-dimethylpyridinol, potassium salt were dispersed in commercial poultry mash to produce animal feed compositions containing various amounts of one of the pyridinol compounds. Portions of these compositions and unmodified mash were employed as described in Example 1 and were fed to flocks of chickens and the chickens inoculated with 50,000 sporulated *Eimeria necatrix* oocysts per bird. One week following the initiation of the diets, the birds were sacrificed, autopsied and an examination made to determine the percent control of coccidiosis. The results obtained in these operations are set forth in the following table.

| Agent Employed in Diet | Percent by Weight of Agent in Feed | Percent Control of Coccidiosis and the Coccidial Organisms |
|---|---|---|
| 3,5-dibromo-2,6-di-methyl-pyridinol. | 0.025 | 100 |
| | 0.0125 | 100 |
| | 0.0062 | 100 |
| 3,5-dibromo-2,6-dimethylpyridinol, hydrobromide. | 0.025 | 100 |
| | 0.0125 | 100 |
| | 0.0062 | 89 |
| 3,5-diiodo-2,6-di-methylpyridinol. | 0.05 | 100 |
| | 0.025 | 92 |
| 3,5-dibromo-2,6-di-methyl-pyridinol, sodium salt. | 0.05 | 100 |
| | 0.025 | 100 |
| | 0.0125 | 100 |
| | 0.0062 | 90 |
| 3,5-dibromo-2,6-di-ethyl-pyridinol. | 0.05 | 85 |
| 3,5-dibromo-2,6-di-methyl-pyridyl acetate. | 0.025 | 100 |
| | 0.0125 | 100 |
| | 0.0062 | 89 |
| 3,5-dibromo-2,6-di-propyl-pyridinol. | 0.05 | 100 |
| 3,5-dibromo-2-ethyl-6-methyl-pyridinol. | 0.05 | 100 |
| | 0.025 | 96 |
| 3,5-dichloro-2,5-di-methyl-pyridinol, potassium salt. | 0.05 | 96 |
| | 0.025 | 96 |
| | 0.0125 | 100 |
| | 0.0062 | 89 |
| Infected check | 0 | (1) |
| Uninfected check | 0 | (2) |

[1] All birds heavily infected with coccidial organisms.
[2] No coccidial organisms or disease.

*Example 7*

Ninety parts by weight of 3-chloro-5-bromo-2,6-dimethylpyridinol, hydroiodide; 3,5-dichloro-2,6-dimethylpyridinol, hydrochloride; 3,5-dibromo-2,6-dimethylpyridinol, hydrochloride; 3,5-dibromo-2,6-dimethylpyridyl propionate; 3,5-dichloro-2,6-dimethylpyridinol, potassium salt; 3,5-diiodo-2,6-dimethylpyridinol, sodium salt; 3,5-dichloro-2,6-dimethylpyridyl acetate; 3,5-dichloro-2,6-dimethylpyridyl propionate; 3,5-dichloro-2-methyl-6-ethylpyridinol; 3,5-dibromo-2-methyl-6-ethylpyridinol; 3,5-dichloro-2,6-dipropylpyridinol; 3,5-dibromo-2-methyl-6-propylpyridinol; or 3,5-dibromo-2-methyl-6-ethylpyridinol, sodium salt are mechanically ground with bentonite to produce concentrate compositions containing 90 percent by weight of one of the pyridine-type compounds.

In a similar manner, feed supplements are prepared by grinding together 50 parts by weight of a pyridine-type compound as identified in the preceding paragraph: 3,5-dichloro-2,6-dibutylpyridinol, acid sulfate; 3,5-diiodo-2,6-dimethylpyridinol, hydroiodide; 3,5-dichloro-2,6-dimethylpyridyl formate; 3,5-dibromo-2,6-dimethylpyridyl formate; 3,5-dichloro-2,6-dimethylpyridinol, sodium salt; 3,5-dibromo-2,6-diethylpyridinol; 3,5-dibromo-2,6-diethylpyridinol, sodium salt; 3,5-dibromo-2,6-dipropylpyridinol, acid phosphate; 3,5-dichloro-2,6-diethylpyridinol; 3,5-dibromo-2,6-diethylpyridinol, ammonum salt or 3,5-dibromo-2,6-dimethylpyridinol, ammonium salt with one part of sorbitan monopalmitate (Span 20) and 49 parts of attapulgite clay to produce compositions containing 50 percent by weight of one of the pyridine-type compounds.

In another operation, 20 parts by weight of a pyridine-type compound as identified in the foregoing two paragraphs: 3,5-dibromo-2,6-dipropylpyridinol, hydrobromide; 3,5-dichloro-2,6-di-(secondary butyl)pyridinol; 3,5-dibromo-2,6-dimethylpyridinol, hydroiodide; 3,5-dichloro-2,6-dimethylpyridyl butyrate; 3,5-dibromo-2,6-dimethylpyridinol, hydrobromide; 3,5-dichloro-2,6-diethylpyridyl acetate; 3,5-dichloro-2,6-dimethylpyridinol ammonium salt; 3,5-dichloro-2,6-dimethylpyridinol, hyrobromide; 3,5-dibromo-2-methyl-6-ethylpyridinol, hydrobromide or 3,5-dichoro-2-methyl-6-ethylpyridinol, potassium salt are mechanically mixed with 80 parts of soybean meal to produce animal feed compositions containing 20 percent of one of the pyridine-type compounds.

In an additional operation, a pyridine-type compound an identified in the foregoing three paragraphs: 3,5-dichloro-2,6-dimethylpyridinol sulfate; 3,5-dibromo-2,6-dimethylpyridinol nitrate; 3-chloro-5-bromo-2,6-dimethylpyridinol; 3-chloro-5-bromo-2,6-dimethylpyridinol phosphate; 3-chloro-5-bromo-2-methyl-6-ethylpyridinol; 3-chloro-5-bromo-2-methyl-6-ethylpyridinol, potassium salt; 3-chloro-5-bromo-2-ethyl-6-methylpyridinol sulfite; 3-bromo-5-iodo-2,6-dimethylpyridinol phosphite; 3-chloro-2-iodo-2,6-dimethylpyridinol; 3-chloro-5-bromo-2,6-diethylpyridinol nitrite or 3,5-dibromo-2,6-dimethylpyridinol lithium salt are separately dispersed in 90 parts of cottonseed oil to prepare edible oil compositions containing one of the pyridine-type compounds.

These compositions are adapted to be administered to animals to supply the desired dosage of active compound or to be employed as concentrates and subsequently diluted with additional edible adjuvants, grain rations or animal feeds to produce animal feed compositions containing the desired amount of active agent.

*Example 8*

The pyridine-type compounds as identified in the paragraphs of the preceding Example 7 are dispersed in commercial chicken mash to produce animal feed compositions containing 0.025 percent by weight of one of the pyridine-type compounds. These compositions are of outstanding nutritive value and are adapted to be fed to animals to obtain a growth-furthering effect and superior feed efficiency. The compositions are also useful in animal husbandry to control protozoan organisms and to mitigate against the attack of gastro-intestinal parasites.

In a further embodiment, the pyridine-type compounds as employed in accordance with the present invention, or compositions containing the same, advantageously can be employed in the present methods in combination with one or more other feed additives including agents active against gastro-intestinal parasites, either as adjuvants or supplemental materials. Representative additives and agents include 2-sulfanilamidoquinoxaline, acetyl(p-nitrophenyl) sulfanilamide, sulfadimethylpyridine, 2,2'-methylene bis(4-chlorophenol), 4,4'-isopropylidene bis(o-cresol), 5-nitro - 2-furaldehyde semicarbazone, furoxone N-(5-nitro-2-furfurylidene-3-amino-2-oxazolidone), 3-nitro - 4 - hydroxyphenyl arsonic acid, p-aminobenzene arsonic acid, (1-(4-amino-2-n-propyl-5-pyrimidinylmethyl) - 2-pycolinum chloride hydrochloride), the complex of 4,4'-dinitrocarbanilide and 2-hydroxy-4,6-dimethylpyrimidine, 4,5-imidazole dicarboxamide, methyl-4-acetamido-2-ethoxybenzoate, oxytetracycline, chlorotetracycline, N-(4'-chlorophenyl)-7-oxabicyclo(2.2.1)-heptane-2,3 - dicarboximide, methyl-4-acetamido-2-ethoxybenzoate, tetraethyl thiuram disulfide, arsenosobenzene, 5-nitro - 2-furaldehyde acetohydrazone, 2,2'-dihydroxy-3,3',5,5' - tetrachlorodiphenylsulfide, 4,6-diamino-2,2-dimethyl-1,3,5-triazine hydrochloride, sulfamethazine, sulfamerazine, sulfadimidine, 2,4-diamino-5-(p-chlorophenyl) - 6 - ethylpyrimidines, 2,4-diamino-5-(3,4-dichlorophenyl)-6,6-diethyl - 5,6-dihydro-1,3,5-triazines, 3,5-dinitrobenzamide, 3,5-dinitro-o-toluamide, 2-chloro-4 - nitrobenzamide and other analogues 2,4-diamino-5-aryl-6-alkylpyrimidines, 2,4-diamino-5-aryl-6,6-dialkyl-5,6-dihydro-1,3,5-triazines, dinitrobenzamides and dinitrotoluamides.

In representative operations, each of the feed additives identified in the preceding paragraph together with one of the pyridine-type compounds as shown in Example 7 are mechanically mixed and ground with commercial poultry mash to produce animal feed compositions. In such operations, the materials are employed in amounts sufficient to provide feed compositions containing 0.0125 percent by weight of one of the feed additives identified in the preceding paragraph and 0.008 percent by weight of one of the pyridine-type compounds shown in Example 7. These compositions are of excellent value in animal husbandry and are adapted to be fed to poultry to obtain a growth-furthering effect and superior feed efficiency and to mitigate against the attack of protozoan organisms and particularly Eimeria organisms.

The 3,5-dihalo-2,6-di(lower alkyl)-4-pyridinols as employed in accordance with the present teachings are conveniently prepared from the 2,6-di-(lower alkyl)-4-pyridinols (enol or keto forms) such as 2,6-dimethyl-4-pyridinol, 2-methyl-6-ethyl-4-pyridinol, 2,6 - diethyl-4-pyridinol, etc. In such procedures, the 2,6-di(lower alkyl)-4-pyridinols are halogenated at temperatures of from 15° to 100° C. in a halo acid in dilute aqueous form as reaction medium to introduce two of the same halogen atoms in the molecule. Following the halogenation, the reaction mixture is neutralized and conveniently with aqueous ammonia, and thereafter filtered to obtain the desired 3,5-dihalo-2,6-di(lower alkyl)-4-pyridinol as a crystalline material.

Where it is desired to introduce different halogen atoms into the molecule, the 2,6-di(lower alkyl)-4-pyridinol is nitrated in known procedures with nitric acid to prepare a 3-nitro-2,6-di(lower alkyl)-4-pyridinol. Hydrogenation of the 3-nitro-2,6-di(lower alkyl)-4-pyridinol with hydrogen at room temperature in ethanol as reaction medium and in the presence of a palladium catalyst yields the corresponding 3-amino-2,6-di(lower alkyl)-4-pyridinol. The latter amino compound is thereafter diazotized with sodium nitrite (NaONO) in an aqueous hydrogen halide acid to produce a monohalo-2,6-di(lower alkyl)pyridinol. Halogenation of this monohalo-2,6-di(lower alkyl)pyridinol in the manner as described in the preceding paragraph gives the desired 3,5-dihalo-2,6-di(lower alkyl)-4-pyridinol containing the same or different halogen atoms on the ring as may be desired.

Treatment of the 3,5-dihalo-2,6-di(lower alkyl)-4-pyridinols with a stoichiometric amount of a mineral acid, alkali metal or ammonia in water as reaction medium gives the mineral acid, alkali metal or ammonium salts. The lower alkanoic acid esters as employed in accordance with the present teachings are conveniently prepared by reacting the 3,5-dihalo-2,6-di(lower alkyl)-4-pyridinols (enol or keto forms) with a lower alkanoic acid or lower alkanoic acid anhydride such as acetic anhydride, propionic anhydride or butyric anhydride. The reaction or esterification is preferably carried out at temperatures of from about 100° to 200° C. and in an organic solvent such as dimethylformamide as reaction medium.

The 2,6-di(lower alkyl)-4-pyridinols (enol and keto forms) employed as described in the preceding paragraph are prepared in known procedures from the 2-alkanoyl-3-oxo-4-alkenoic acid, Δ-lactones corresponding to the formula:

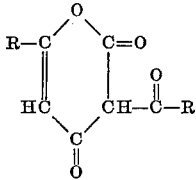

In such method, the 2-alkanoyl-3-oxo-4-alkenoic acid, Δ-lactone is decarboxylated by treatment with hydrochloric acid at about 100° C. to obtain a 2,6-di(lower alkyl)-4H-pyran-4-one having the formula:

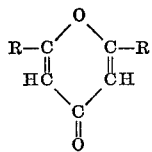

Ammonolysis or treatment of the 2,6-di(lower alkyl)-4H-pyran-4-one with aqueous ammonia gives the corresponding 2,6-di(lower alkyl)-4-pyridinols in good yields.

What is claimed is:

1. In the practice of animal husbandry, the method which comprises orally administering to animals a material selected from the group consisting of 3,5-dihalo-2,6-di(lower alkyl)-4-pyridinol and its lower alkanoic acid ester and its alkali metal, ammonium and mineral acid salt, said compound being employed daily in the amount of from 3 to 2,000 milligrams per kilogram of body weight.

2. The method which comprises feeding an animal a composition comprising an active ingredient in intimate admixture with an innocuous ingestible adjuvant, the active ingredient being a material selected from the group consisting of 3,5-dihalo-2,6-di(lower alkyl)-4-pyridinol and its lower alkanoic acid ester and its alkali metal, ammonium and mineral acid salt, and the composition being fed in an amount sufficient to provide a daily dosage of from 3 to 2,000 milligrams of active ingredient per kilogram of body weight.

3. The method claimed in claim 1 wherein the material is 3,5-dihalo-2,6-di(lower alkyl)-4-pyridinol.

4. The method claimed in claim 1 wherein the material is the alkali metal salt of 3,5-dihalo-2,6-di(lower alkyl)-4-pyridinol.

5. The method claimed in claim 1 wherein the material is fed daily in an amount of from 3 to 250 milligrams per kilogram of body weight.

6. The method claimed in claim 1 wherein the material is 3,5-dichloro-2,6-dimethyl-4-pyridinol.

7. The method claimed in claim 1 wherein the material is 3,5-dibromo-2,6-dimethyl-4-pyridinol.

8. The method claimed in claim 1 wherein the material is 3,5-dichloro-2,6-dimethyl-4-pyridinol, sodium salt.

9. The method claimed in claim 1 wherein the material is 3,5-dibromo-2,6-dimethyl-4-pyridinol, sodium salt.

10. The method claimed in claim 1 wherein the material is 3,5-dichloro-2,6-dimethyl-4-pyridyl acetate.

11. The composition comprising from 5 to 98 percent by weight of an active agent in intimate admixture with an edible finely divided solid, the active ingredient being a compound selected from the group consisting of 3,5-dihalo-2,6-di(lower alkyl)-4-pyridinol and its lower alkanoic acid ester and its alkali metal, ammonium and mineral acid salt.

12. The composition claimed in claim 11 wherein the active ingredient is 3,5-dichloro-2,6-dimethyl-4-pyridinol, sodium salt.

13. The composition claimed in claim 11 wherein the active ingredient is an alkali metal salt of 3,5-dibromo-2,6-dimethyl-4-pyridinol.

14. The composition claimed in claim 11 wherein the active agent is 3,5-dichloro-2,6-dimethyl-4-pyridinol.

15. The composition claimed in claim 11 wherein the active agent is 3,5-dibromo-2,6-dimethyl-4-pyridinol.

16. The composition claimed in claim 11 wherein the active ingredient is 3,5-dichloro-2,6-dimethyl-4-pyridyl acetate.

17. The animal feed containing from 0.001 to 0.5 percent by weight of a compound selected from the group consisting of 3,5-dihalo-2,6-di(lower alkyl)-4-pyridinol and its lower alkanoic acid ester and its alkali metal, ammonium and mineral acid salt.

18. The poultry feed containing from 0.001 to 0.1 percent by weight of 3,5-dihalo-2,6-di(lower alkyl)-4-pyridinol.

19. The poultry feed containing from 0.001 to 0.1 percent by weight of an alkali metal salt of 3,5-dihalo-2,6-di(lower alkyl)-4-pyridinol.

No references cited.

JULIAN S. LEVITT, *Primary Examiner*.